(12) United States Patent
Shindo

(10) Patent No.: US 9,010,599 B2
(45) Date of Patent: Apr. 21, 2015

(54) CUP HOLDER

(75) Inventor: Takashi Shindo, Aichi (JP)

(73) Assignee: Nifco Inc., Yokohama-Shi (JP)

( * ) Notice: Subject to any disclaimer, the term of this patent is extended or adjusted under 35 U.S.C. 154(b) by 30 days.

(21) Appl. No.: 13/542,064

(22) Filed: Jul. 5, 2012

(65) Prior Publication Data

US 2013/0008932 A1 Jan. 10, 2013

(30) Foreign Application Priority Data

Jul. 5, 2011 (JP) ................................. 2011-148937

(51) Int. Cl.
*B60R 7/06* (2006.01)
*B60N 3/10* (2006.01)

(52) U.S. Cl.
CPC .. *B60N 3/102* (2013.01); *B60R 7/06* (2013.01)

(58) Field of Classification Search
CPC .............. B60R 7/08; B60R 7/06; B60R 11/02
USPC ......................... 224/483; 248/27.1; 296/37.12
See application file for complete search history.

(56) References Cited

U.S. PATENT DOCUMENTS

| | | | |
|---|---|---|---|
| 4,953,771 A * | 9/1990 | Fischer et al. ................. | 224/549 |
| 4,981,277 A * | 1/1991 | Elwell .......................... | 248/311.2 |
| 5,190,259 A * | 3/1993 | Okazaki ....................... | 248/311.2 |
| 5,460,309 A * | 10/1995 | Nehl et al. .................... | 224/281 |
| 5,680,974 A * | 10/1997 | Vander Sluis ................. | 224/281 |
| 6,065,729 A * | 5/2000 | Anderson ..................... | 248/311.2 |
| 6,575,542 B2 | 6/2003 | Shimajiri | |
| 6,702,241 B2 * | 3/2004 | Harada ......................... | 248/311.2 |
| 6,799,705 B1 * | 10/2004 | Lutoslawski .................. | 224/483 |
| 7,051,985 B2 | 5/2006 | Takahashi | |
| 7,896,303 B2 * | 3/2011 | Yamamoto et al. .......... | 248/311.2 |
| 2006/0027617 A1 * | 2/2006 | Kogami et al. ............... | 224/483 |
| 2006/0060741 A1 | 3/2006 | Yanagita et al. | |

FOREIGN PATENT DOCUMENTS

| | | |
|---|---|---|
| CN | 1422769 A | 6/2003 |
| JP | S63-138252 U | 9/1988 |
| JP | H08-192669 A | 7/1996 |
| JP | 2000-062513 A | 2/2000 |
| JP | 2002-096670 A | 4/2002 |
| JP | 2005-096614 A | 4/2005 |

OTHER PUBLICATIONS

China Patent Office, "Office Action for CN201210232363.9," May 5, 2014.
Japan Patent Office, "Office Action for JP 2011-148937," Feb. 3, 2015.

* cited by examiner

*Primary Examiner* — Brian D Nash
(74) *Attorney, Agent, or Firm* — Manabu Kanesaka

(57) ABSTRACT

A cup holder has a case; a holder body disposed movably between a stored position wherein the holder body is stored in the case, and an in-use position wherein the holder body projects from the opening; a guide wall; a container-holding member disposed swivelably on the holder body; a coupling device disposed in the container-holding member for swiveling; and a coupled device formed on the guide wall, and coupling with the coupling device to restrict the movement of the holder body toward the stored position. When the holder body is drawn out from the case, a coupling device slides on the guide wall, and the container-holding member swivels from the stored position toward the container-holding position. When the holder body is stored in the case, the coupling device slides on the guide wall, and the container-holding member swivels from the container-holding position toward the stored position.

11 Claims, 13 Drawing Sheets

CUP HOLDER

FIELD OF TECHNOLOGY

This invention relates to a cup holder built into a dashboard, or the like, of an automobile.

BACKGROUND TECHNOLOGY

A conventional example of a cup holder is in patent document 1. In the cup holder of this conventional technology, a locking claw provided on a holder member couples to an open end of a storage case in an in-use position in which the holder member is drawn out from the storage case. Also, the holder member does not inadvertently move from the in-use position when being subjected to an impact force of a sudden stop of the vehicle, or the like.

PRIOR ART DOCUMENTS

Patent Documents

[Patent Document 1] Japanese Utility Model Publication No. S63-138252

SUMMARY OF THE INVENTION

Problem to Be Solved by the Invention

However, in patent document 1, when the holder member is drawn out from the storage case, the locking claw provided on the holder member moves on an inside upper surface of the storage case in an elastically deformed state, and couples to a front end of the storage case on returning from the elastic deformation after passing through the opening of the storage case. Therefore, the operating force during drawing out and during storing of the holder member is large and the operability is poor.

In consideration of the abovementioned circumstances, an object of the present invention is to obtain a cup holder that does not inadvertently move from an in-use position and can be improved in operability.

Device for Solving the Problem

The cup holder of the present invention according to first aspect comprises: a case having an opening; a holder body disposed movably between a stored position in which the holder body is stored in the case and an in-use position in which the holder body is projecting from the opening; a guide wall formed on the case; a container-holding member disposed swivelably on the holder body between a stored position in which the container-holding member is storable in the case and a container-holding position in which the container-holding member is holding a container; a coupling device disposed in the container-holding member from said container-holding position toward said stored position; and a coupled device formed on the guide wall, and coupling with the coupling device when the holder body moves from the in-use position toward the stored position to restrict the movement of the holder toward the stored position. When the holder body is drawn out from the case, the coupling device slides on the guide wall and the container-holding member swivels from said stored position toward said container-holding position. When the holder body is stored in the case, the coupling device slides on the guide wall, and the container-holding member swivels from the container-holding position toward the stored position.

In the cup holder of the present invention according to the first aspect, when the holder body is drawn out from the case, the coupling device provided on the container-holding member slide with the guide surface formed on the case, and the container-holding member is swiveled from the stored position toward the container-holding position. Also, when the holder body moves from the in-use position toward the stored position, the coupled device formed on the guide surface couple with the coupling device, and movement of the holder body toward the stored position is restricted. Therefore, the holder body does not inadvertently move from the in-use position toward the stored position. Also, because the coupled device are formed on the guide surface on which the coupling device for causing the container-holding member to swivel from between the stored position and the container-holding position slides, the force for drawing out of the holder body does not increase and the operability is improved. When the coupling between the coupled device and the coupling device is released and the holder body is stored in the case, the coupling device slide with the guide surface and the container-holding member swivels from the container-holding position toward the stored position.

The second aspect of the present invention according to the cup holder in the first aspect, further comprises an urging device for urging the coupling device toward the guide surface.

In the cup holder of the present invention according to the second aspect, the coupling device is urged toward the guide surface by the urging device. Therefore, the coupling device slides without moving away from the guide surface of the case, and the coupling device assuredly couples to the coupled device. Also, the coupling device can easily ride over the coupled device by the urging force of the urging device.

The third aspect of the present invention according to the cup holder in the first or second aspect, wherein the coupled device is a projection having a first guide surface on an upstream side in a direction of sliding when drawing out the holder body and a second guide surface on a downstream side in the direction of sliding, and an angle of inclination of the second guide surface relative to the guide surface is greater than an angle of inclination of the first guide surface relative to the guide surface.

In the cup holder of the present invention according to the third aspect, the angle of inclination, relative to the guide surface, of the second guide surface of the coupled device on the downstream side in the direction of sliding when drawing out the holder body is greater than the angle of inclination, relative to the guide surface, of the first guide surface on the upstream side in the direction of sliding. Therefore, the force for pushing in the case of storing the holder body becomes greater than the force for drawing out in the case of drawing the holder body out. As a result, by a simple configuration, the operating force during drawing out of the holder body does not increase, and the holder body does not inadvertently move from the in-use position.

In the fourth aspect of the present invention according to the cup holder in the first or second aspect, wherein the coupled device is a projection formed on the guide surface and having an indentation to be coupled with the coupling device in the in-use position.

In the cup holder of the present invention according to the fourth aspect, when the holder body is drawn out from the case and reaches the in-use position, the coupling device couples to the indentation on the projection formed on the guide surface. Therefore, a precise shift feel in the in-use position is obtained and the operability is further improved.

The fifth aspect of the present invention according to the cup holder in any one of the first to fourth aspects, further comprises a stopper being formed on a downstream side in a direction of drawing out from the coupled device on the guide surface, and contacting with the coupling device to check movement of the holder body in the direction of drawing out.

In the cup holder of the present invention according to the fifth aspect, when the holder body is completely drawn out from the case, the coupling device contacts with the stopper formed on the downstream side in the direction of drawing out from the coupled device on the guide surface, and movement of the holder body in the direction of drawing out is checked. Therefore, there is no need to separately provide a stopper for checking movement of the holder body in the direction of drawing out on at least one of the holder body and the case. As a result, production of the case and the holder body becomes easier.

The sixth aspect of the present invention according to the cup holder in any one of the first to fifth aspects, wherein the coupling device is shaft-shaped, and a side surface of the shaft shape slides with the guide surface.

In the cup holder of the present invention according to the sixth aspect, because the side surface of the coupling device made as a shaft shape slides with the guide surface, the area of contact between the coupling device and the coupled device becomes smaller compared with a configuration in which the end surface of the shaft shape slides. Therefore, the operating force becomes smaller and the operability is further improved.

The seventh aspect of the present invention according to the cup holder in any one of the first to sixth aspects, wherein the container-holding part of the container-holding member is arc-form, and the container-holding member swivels toward a direction in which the container-holding part is in the container-holding position when the holder body moves toward the direction of drawing out from the case, and the container-holding member swivels toward a direction in which the container-holding part is in the stored position when the holder body moves toward the direction of storage into the case.

In the cup holder of the present invention according to the seventh aspect, the container-holding member swivels toward the direction in which the arc-form container-holding part is in the container-holding position when the holder body moves toward the direction of drawing out from the case, and the container-holding member swivels toward the direction in which the arc-form container-holding part is in the storage position when the holder body moves toward the storage direction. Therefore, the cup holder in the stored state can be made compact.

The eighth aspect of the present invention according to the cup holder in any one of the first to sixth aspects, wherein the container-holding part of the container-holding member is circular, and the container-holding member swivels toward a direction in which the container-holding part is in the container-holding position when the holder body moves toward the direction of drawing out from the case, and the container-holding member swivels toward a direction in which the container-holding part is in the stored position when the holder body moves toward the direction of storage into the case.

In the cup holder of the present invention according to the eighth aspect, the container-holding member swivels toward the direction in which the circular container-holding part becomes in the container-holding position when the holder body moves toward the direction of drawing out from the case, and the container-holding member swivels toward the direction in which the circular container-holding part is in the storage position when the holder body moves toward the storage direction. Therefore, the cup holder in the stored state can be made compact.

Effects of the Invention

Because the cup holder of the present invention according to the first aspect is configured as mentioned above, the cup holder does not inadvertently move from the in-use position and the operability can be improved.

Because the cup holder of the present invention according to the second aspect is configured as mentioned above, the coupling device can assuredly couple to the coupled device. Also, the coupling device can easily ride over the coupled device.

Because the cup holder of the present invention according to the third aspect is configured as mentioned above, the cup holder does not inadvertently move from the in-use position and the operability can be improved with a simple configuration.

Because the cup holder of the present invention according to the fourth aspect is configured as mentioned above, the operability can be further improved.

Because the cup holder of the present invention according to the fifth aspect is configured as mentioned above, production of the case and the holder body becomes easier.

Because the cup holder of the present invention according to the sixth aspect is configured as mentioned above, the operability can be further improved.

Because the cup holder of the present invention according to the seventh aspect is configured as mentioned above, the cup holder in the stored state can be made compact.

Because the cup holder of the present invention according to the eighth aspect is configured as mentioned above, the cup holder in the stored state can be made compact.

EMBODIMENTS OF THE INVENTION

First Embodiment

Figure 1:
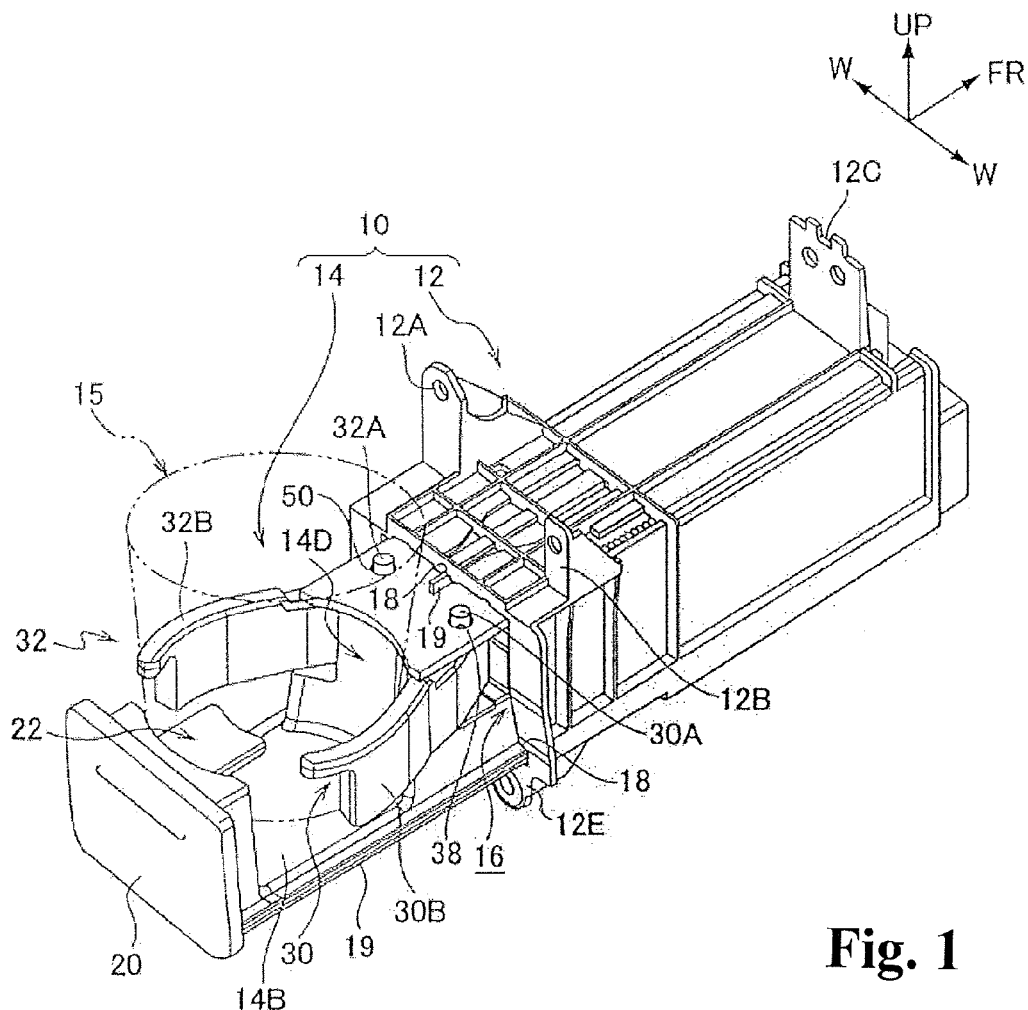
FIG. 1 is a perspective view illustrating the in-use state of the cup holder according to the first embodiment of the present invention.

A first embodiment of the cup holder of the present invention is described according to FIGS. 1 to 5.

In the drawings, the same symbols are assigned to members (constituent elements) having the same or corresponding functions, and the descriptions are suitably omitted. Also, in the drawings, the arrow FR indicates the direction toward the front of an automobile body in which the cup holder of the present embodiment is installed, the arrow UP indicates the direction upward, and the arrow W indicates the width direction of the vehicle.

Figure 2:
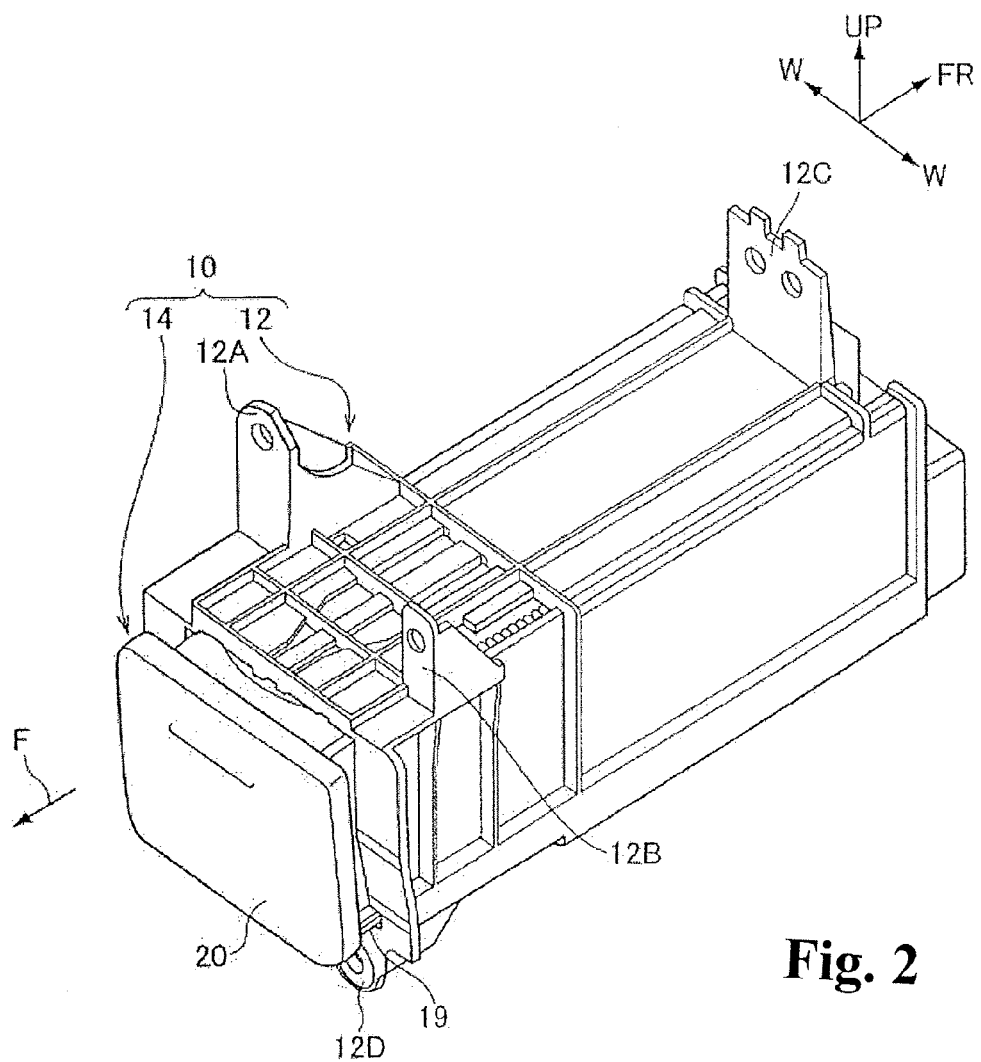
FIG. 2 is a perspective view illustrating the stored state of the cup holder according to the first embodiment of the present invention.

As illustrated in FIG. 1, the cup holder 10 of the present embodiment has a case 12 and a holder body 14. Also, the case 12 of the holder body 10 is installed in the dashboard of the automobile as an example. Meanwhile, the holder body 14 of the cup holder 10 is capable of being drawn out toward the rear of the vehicle from the case 12 and moving between an in-use position to be capable of holding a cup of other container 15 and a stored position being stored in the case 12 as illustrated in FIG. 2.

Figure 3:
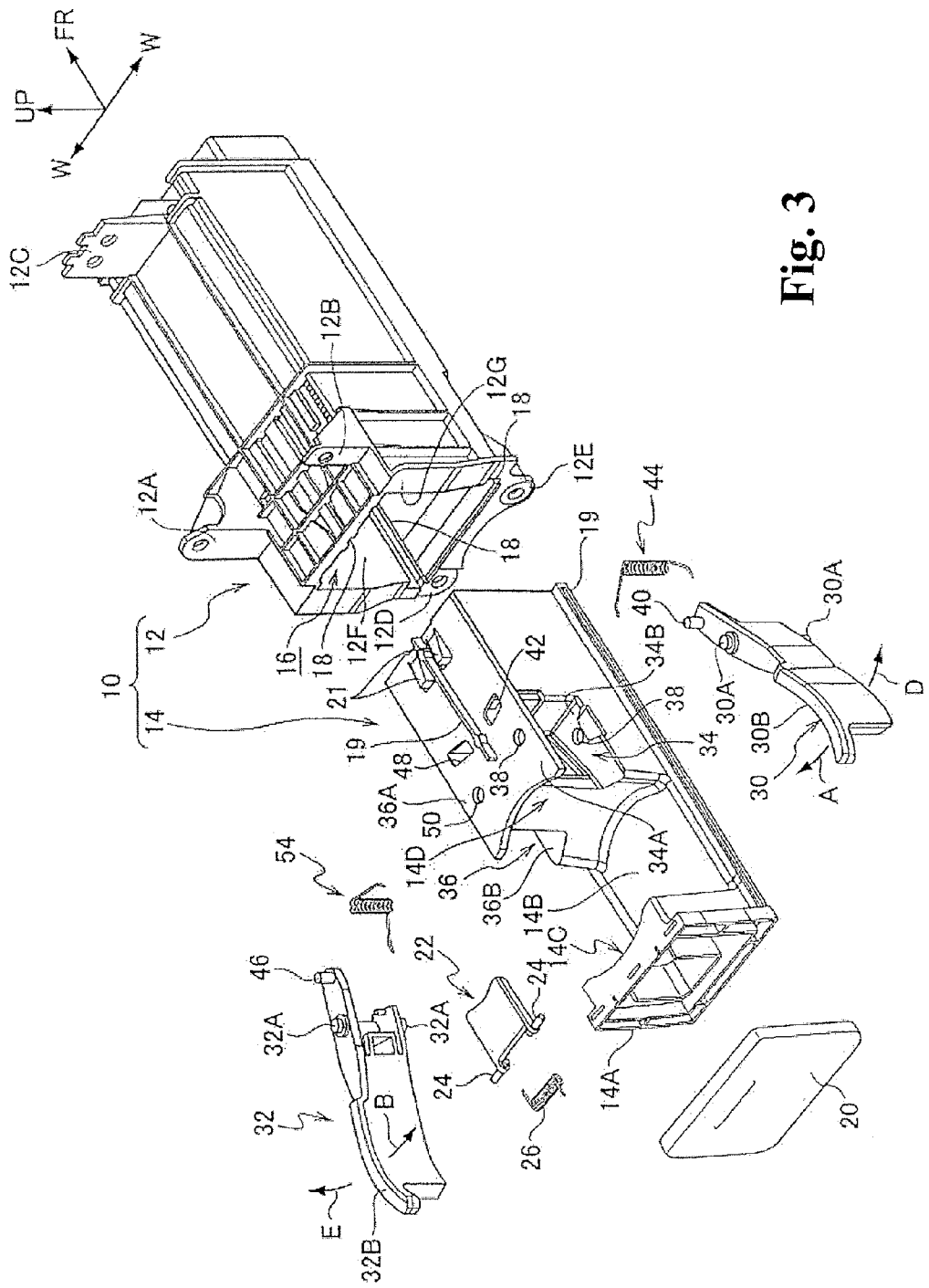
FIG. 3 is a decomposed perspective view illustrating the cup holder according to the first embodiment of the present invention.

As illustrated in FIG. 3, the case 12 has a rectangular tube shape with a longitudinal direction in the front-to-back direction of the vehicle, and installation parts 12A, 12B, 12C, 12D, and 12E for installation on the vehicle are formed projecting on the outer perimeter part. Also, an opening 16 is formed on the side face toward the rear of the vehicle of the case 12. Meanwhile, on an inner perimeter part of the case 12, guide rails 18 are formed following the front-to-back direction of the vehicle, respectively on each lower end part of a left inside wall part 12F and a right inside wall part 12G and on a center part in the width direction of the vehicle of an upper inside wall part 12H.

The holder body 14 has a rectangular block shape with a longitudinal direction in the front-to-back direction of the vehicle, and guide rails 19 are formed following the front-to-back direction of the vehicle, respectively on lower end parts of left and right outside wall parts and on a center part in the width direction of the vehicle of an upper side outer wall part. The holder body 14 moves against the case 12 toward the front-to-back direction by sliding with these guide rails 19 and the guide rails 18 of the case 12. One pair of stoppers 21 is formed on the left and right with the guide rail 19 in between on a front end part of the upper outside wall part of the holder body 14. These stoppers 21 are lockable in one pair of locking holes 23 (see FIG. 4) on the left and right formed on the case 12, and the holder body 14 is prevented from falling off from the case 12 by the locking of the stoppers 21 in the locking holes 23. Also, an operating part 20 is installed on an operating part installation part 14A formed on an end part of the holder body 14 on the side toward the rear of the vehicle. Meanwhile, a container-mounting part 14B for mounting the container 15 (see FIG. 1) is formed on the side toward the front of the vehicle of the operating part installation part 14A. The container-mounting part 14B has a board form being recessed downward compared the other places on the holder body 14.

A part on the side toward the front of the vehicle of the operating part installation part 14A of the holder body 14 serves as a container-holding part 14C for holding the side wall of the container 15, and a flange 22 is attached to the container-holding part 14C. The flange 22 is capable of swiveling toward the front and back of the vehicle with an upper end part thereof being axially supported on one pair of shafts 24 placed following the width direction of the vehicle. Also, a coil spring 26 is installed on the upper end part of the flange 22, so that the flange 22 is urged toward the front of the vehicle and presses the side wall of the container 15.

A container-holding part 14D for holding the side wall of the container 15 is formed on the side toward the front of the vehicle of the container-mounting part 14B of the holder body 14, and the container-holding part 14D is formed as curved surface being convex toward the front of the vehicle. Also, a right arm support part 34 is formed being recessed from the right outside in the width direction of the vehicle on an upper part on the side toward the front of the vehicle of the container-holding part 14D, and a left arm support part 36 is formed being recessed from the left outside in the width direction of the vehicle on an upper part on the side toward the front of the vehicle of the container-holding part 14D. Circular holes 38 are formed in opposite positions respectively on an upper wall part 34A and a lower wall part 34B of the right arm support part 34. Rotating shaft parts 30A projecting upward and downward from the middle part in the front-to-back direction of a right arm 30 as a container-holding member are axially supported in these circular holes 38, so that the right arm 30 is rotatable in the width direction of the vehicle (the direction of arrow A and the direction of arrow D in FIG. 3). Meanwhile, circular holes 50 are formed in opposite positions respectively on an upper wall part 36A and a lower wall part 36B of the left arm support part 36. Rotating shaft parts 32A projecting upward and downward from the middle part in the front-to-back direction of a left arm 32 as a container-holding member are axially supported in these circular holes 50, so that the left arm 32 is rotatable in the width direction of the vehicle (the direction of arrow B and the direction of arrow E in FIG. 3).

A rear part of the right arm 30 serves as a container-holding part 30B. The container-holding part 30B has an arc shape being convex toward the outside in the width direction of the vehicle, and is used for holding the side wall of a container mounted on the container-mounting part 14B. Meanwhile, a coupling pin 40 as a coupling device is formed projecting on a front part of the right arm 30, and the cross section of the coupling pin 40 has a circular shaft shape. Also, the coupling pin 40 runs through a long hole 42 formed following the width direction of the vehicle on the upper wall part 34A of the right arm support part 34, and a leading end part projects upward from the upper wall part 34A. Therefore, when the right arm 30 swivels toward the width direction of the vehicle centered on the rotating shaft part 30A, the coupling pin 40 swivels in the width direction of the vehicle inside the long hole 42.

A coil spring 44 as an urging device is installed on the rear end part of the right arm 30, and the coil spring 44 urges the right arm 30 toward the direction in which the container-holding part 30B moves from the stored position to the container-holding position (the direction of arrow D in FIG. 3).

Meanwhile, the left arm 32 is such that a coupling pin 46 as a coupling device, having a shaft shape being circular in cross section, swivels inside a long hole 48 formed following the width direction of the vehicle on the upper wall part 36A of the left arm support part 36. Also, a coil spring 54 installed on the rear end part of the left arm 32 urges the left arm 32 toward the direction in which the container-holding part 32B moves from the stored position to the container-holding position (the direction of arrow E in FIG. 3). Because the left arm 32 has the same configuration as the right arm 30, the detailed description of the left arm 32 is omitted.

Figure 4:
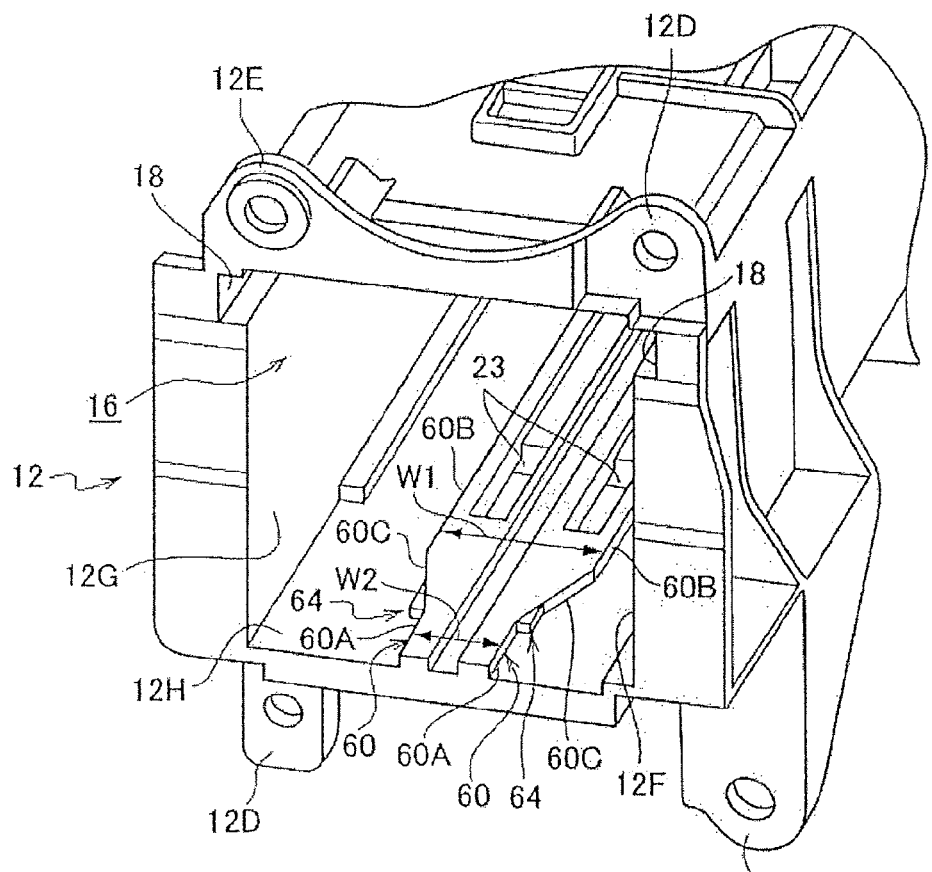
FIG. 4 is an enlarged perspective view illustrating the upper inner wall part of the case of the cup holder according to the first embodiment of the present invention.

As illustrated in FIG. 4, one pair of guide walls 60 is formed on the left and right as a guide surface following the front-to-back direction of the vehicle on a middle part in the width direction of the vehicle of the upper inside wall part 12H of the case 12. A distance W1 in the width direction of the vehicle on a rear part 60A proximal to the opening 16 of the case 12 on the one pair of guide walls 60 on the left and right is narrower than a distance W2 in the width direction of the vehicle on a front part 60B of the guide wall 60. Also, a middle part in the front-and-back direction of the vehicle of the guide wall 60 serves as an inclined part 60C connecting the rear part 60A and the front part 60B of the guide wall 60 in a straight linear form. Furthermore, a projection 64 as a coupled device is formed on an end part on the side of the rear part 60A on the inclined part 60C of the guide wall 60.

Figure 5:
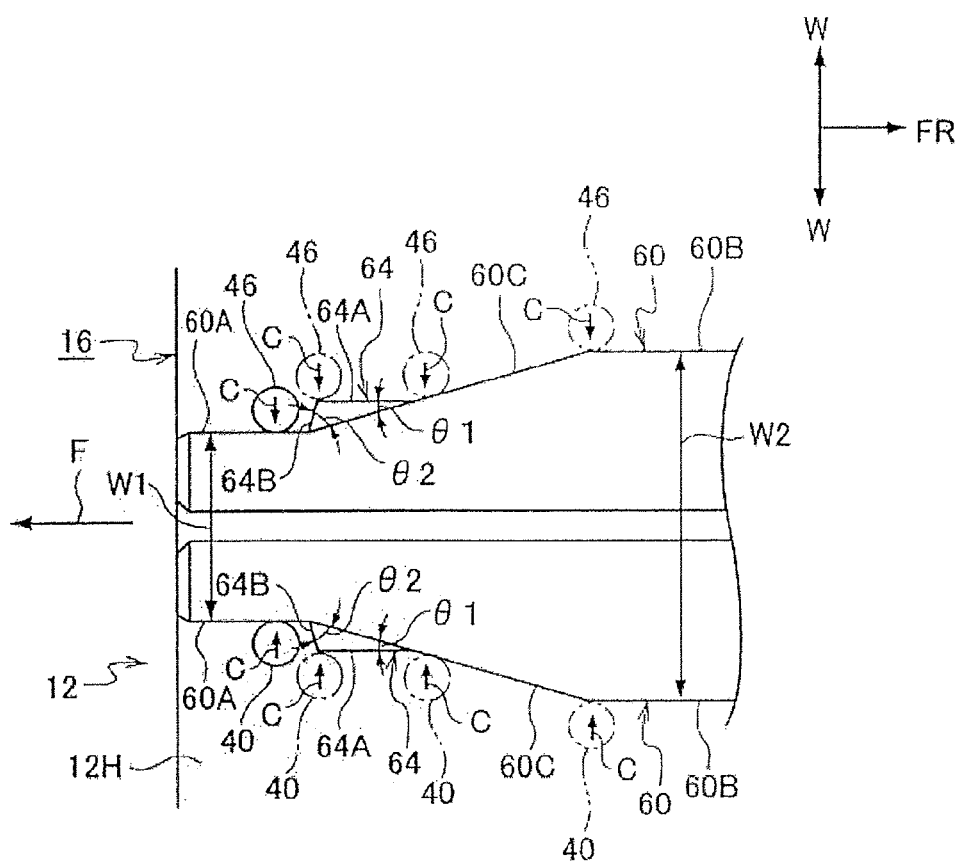
FIG. 5 is an enlarged plan view illustrating the coupling device and the coupled device of the cup holder according to the first embodiment of the present invention.

As illustrated in FIG. 5, the shape viewed from above the vehicle of the projection 64 is triangular, and one side of the triangle becoming on the upstream side in the direction of sliding during drawing out of the holder body 14 serves as a first guide surface 64A continuing on the inclined part 60C. Also, the projection 64 is such that another side of the triangle becoming on the downstream side in the direction of sliding during drawing out of the holder body 14 serves as a second guide surface 64B continuing on the rear part 60A. An angle of inclination θ2 of the second guide surface 64B relative to the inclined part 60C of the guide wall 60 is greater than an angle of inclination θ1 of the first guide surface 64A relative to the inclined part 60C of the guide wall 60 (θ1<θ2). Also, the first guide surface 64A extends in the front-to-back direction of the vehicle, and the second guide surface 64B is roughly perpendicular to the rear part 60A of the guide wall 60.

Accordingly, when the holder body 14 is drawn out toward the rear of the vehicle from the stored position being stored in the case 12 (the position in FIG. 2), the side surfaces of the coupling pins 40 and 46 slide with the guide wall 60 and move from the front of the vehicle toward the rear of the vehicle as indicated by the triple-dotted line, double-dotted line, single-dotted line, and solid line in FIG. 5. At this time, the coupling pins 40 and 46 are pressed in the direction of the guide wall 60 (the direction of arrow C in FIG. 5) by the coil springs 44 and 54.

Described more specifically, when the holder body 14 is drawn out from the case 12 and moves toward the rear of the vehicle (the direction of arrow F in FIG. 5), the coupling pins 40 and 46 first slide with the front part 60B of the guide wall 60 as indicated by the triple-dotted line. At this time, because the coupling pins 40 and 46 do not move in the width direction of the vehicle, the right arm 30 and the left arm 32 do not swivel.

When the holder body 14 is moved further toward the rear of the vehicle, the coupling pins 40 and 46 move from the front part 60B of the guide wall 60 to the inclined part 60C as indicated by the double-dotted line and slide with the inclined part 60C. At this time, the coupling pins 40 and 46 move closer to each other (the direction of arrow C in FIG. 5) by the urging force of the coil springs 4A and 54, and the container-holding part 30B of the right arm 30 and the container-holding part 32B of the left arm 32 move away from each other, and swivel toward the direction of the container-holding position (the direction of arrow D and the direction of arrow E in FIG. 3).

When the holder body 14 is moved further toward the rear of the vehicle, the coupling pins 40 and 46 move from the inclined part 60C of the guide wall 60 to the first guide surface 64A of the projection 64 and slide with the first guide surface 64A of the projection 64 as indicated by the single-dotted line. At this time, because the coupling pins 40 and 46 do not move in the width direction of the vehicle, the right arm 30 and the left arm 32 do not swivel.

When the holder body 14 is moved further toward the rear of the vehicle, the coupling pins 40 and 46 ride over the second guide surface 64B from the first guide surface 64A of the projection 64 as indicated by the solid line. At this time, the coupling pins 40 and 46 move in the width direction moving closer to each other (the direction of arrow C in FIG. 5) by the urging force of the coil springs 44 and 54, and the container-holding part 30B of the right arm 30 and the container-holding part 32B of the left arm 32 move away from each other, and swivel toward the direction of the container-holding position (the direction of arrow D and the direction of arrow E in FIG. 3).

Also, the coupling pins 40 and 46 riding over the projection 64 slide with the rear part 60A of the guide wall 60. At this time, because the coupling pins 40 and 46 do not move in the width direction of the vehicle, the right arm 30 and the left arm 32 do not swivel.

Meanwhile, in the case when the holder body 14 is subject to an impact force of a sudden stop of the vehicle, or the like, in a state being in the in-use position having been drawn out from the case 12 toward the rear of the vehicle (the position in FIG. 1) and the holder body 14 starts to move against the case 12 toward the front of the vehicle, the coupling pins 40 and 46 slide with the rear part 60A of the guide wall 60 and move slightly toward the front of the vehicle, but couple with the second guide surface 64B of the projection 64. Therefore, the movement of the holder body 14 toward the stored position is restricted. That is, the movement of the coupling pins 40 and 46 toward the front of the vehicle is checked by the projection 64, and the holder body 14 does not move against the case 12 toward the front of the vehicle.

Also, in the case when the holder body 14 is to be returned by the operator from the in-use position (the position in FIG. 1) to the stored position (the position in FIG. 2), the holder body 14 is pushed with force toward the front of the vehicle, and the coupling pins 40 and 46 are caused to slide with the second guide surface 64B of the projection 64 so as to ride over the projection 64. If the container-holding part 30B of the right arm 30 and the container-holding part 32B of the left arm 32 are caused by the operator to swivel toward the direction of the stored position moving closer to each other in opposition to the urging force of the coil springs 44 and 54, the coupling pins 40 and 46 move toward the direction of moving away, and therefore the coupling pins 40 and 46 can easily ride over the projection 64.

(Operation and Effects)

The operation and effects of the present embodiment are next described.

(Case when Drawing Holder Body to In-Use Position)

In the cup holder 10 of the present embodiment, in the case when the holder body 14 is to be drawn out from the case 12 to the in-use position, the operating part 20 is gripped by the operator and the holder body 14 is drawn out toward the rear of the vehicle (the direction of arrow F in FIG. 2). At this time, as illustrated in FIG. 1, the holder body 14 moves toward the rear of the vehicle by sliding with the guide rails 18 formed on the inner perimeter part of the case 12 and the guide rails 19 formed on the outer perimeter part of the holder body 14. At the same time, as illustrated in FIG. 5, the coupling pin 40 formed on the right arm 30 and the coupling pin 46 formed on the left arm 32 move toward the rear of the vehicle (the direction of arrow F in FIG. 5) following the guide wall 60 formed on the upper inside wall part 12H of the case 12.

Also, the coupling pins 40 and 46 formed on the right arm 30 and the left arm 32 are urged by the coil springs 44 and 54 to move in the width direction of the vehicle moving closer to each other (the direction of arrow C in FIG. 5). Therefore, the coupling pins 40 and 46 slide in a state being pressed to the guide wall 60.

Accordingly, when the holder body 14 is moved toward the rear of the vehicle, the coupling pins 40 and 46 first slide with the front part 60B of the guide wall 60 as indicated by the triple-dotted line. At this time, because the coupling pins 40 and 46 do not move in the width direction of the vehicle, the right arm 30 and the left arm 32 do not swivel.

Next, when the holder body 14 is moved further toward the rear of the vehicle, the coupling pins 40 and 46 move from the front part 60B of the guide wall 60 to the inclined part 60C and slide with the inclined part 60C as indicated by the double-dotted line. At this time, the coupling pins 40 and 46 move in the width direction of the vehicle moving closer to each other (the direction of arrow C in FIG. 5) by the urging force of the coil springs 44 and 54. Therefore, the right arm 30 and the left arm 32 swivel toward the direction in which the container-holding part 30B of the right arm 30 and the container-holding part 32B of the left arm 32 move away from each other and become in the container-holding position (the direction of arrow D and the direction of arrow E in FIG. 3).

Next, when the holder body 14 is moved further toward the rear of the vehicle, the coupling pins 40 and 46 move from the inclined part 60C of the guide wall 60 to the first guide surface 64A of the projection 64 and slide with the first guide surface 64A of the projection 64 as indicated by the single-dotted line. At this time, because the coupling pins 40 and 46 do not move in the width direction of the vehicle, the right arm 30 and the left arm 32 do not swivel.

Next, when the holder body 14 is moved further toward the rear of the vehicle, the coupling pins 40 and 46 ride over the second guide surface 64B from the first guide surface 64A of the projection 64 as indicated by the solid line. At this time, the coupling pins 40 and 46 move in the width direction of the vehicle moving closer to each other (the direction of arrow C in FIG. 5) by the urging force of the coil springs 44 and 54. Therefore, the right arm 30 and the left arm 32 swivel toward the direction in which the container-holding part 30B of the right arm 30 and the container-holding part 32B of the left arm 32 move away from each other and become in the container-holding position (the direction of arrow D and the direction of arrow E in FIG. 3), and the cup holder becomes in the container-holding position being capable of holding a container 15.

Also, the coupling pins 40 and 46 ride over the projection 64 and slide with the rear part 60A of the guide wall 60. At this time, because the coupling pins 40 and 46 do not move in the width direction of the vehicle, the right arm 30 and the left arm 32 do not swivel. Also, the stopper 21 of the holder body 14 couples in the locking hole 23 of the case 12, and the holder body 14 stops in the in-use position.

(Case when Holder Body is Subject to Impact Force Toward Direction to be Stored in Case)

Meanwhile, in the case when the holder body 14 is subject to an impact force of a sudden stop of the vehicle, or the like, in a state being in the in-use position (the position in FIG. 1) and the holder body 14 starts to move against the case 12 toward the front of the vehicle, the coupling pins 40 and 46 slide with the rear part 60A of the guide wall 60 and move slightly toward the front of the vehicle. Then the coupling pins 40 and 46 couple with the second guide surface 64B of the projection 64. Therefore, the movement of the coupling pins 40 and 46 toward the front of the vehicle is checked, and the holder body 14 does not inadvertently move against the case 12 from the in-use position toward the front of the vehicle.

Also, in the cup holder 10 of the present embodiment, the coupling pins 40 and 46 for causing the right arm 30 and the left arm 32 to swivel between the stored position and the container-holding position move smoothly following the guide wall 60 and couple with the projection 64 formed on the guide wall 60. Therefore, the force for drawing out of the holder body does not increase and the operability can be improved, compared with a configuration in which, as in the conventional configuration, when the holder member is drawn out from the storage case, the locking claw provided on the holder member moves on the inside upper surface of the storage case in an elastically deformed state, and couples to the front end of the storage case on returning from the elastic deformation after passing through the opening of the storage case.

Also, in the present embodiment, the coupling pins 40 and 46 are urged toward the guide wall 60 as a guide surface by the urging force of the coil springs 44 and 54. Therefore, the coupling pins 40 and 46 slide without moving away from the guide wall 60, and the coupling pins 40 and 46 assuredly couple to the second guide surface 64B of the projection 64. Also, the coupling pins 40 and 46 can easily rise over the projection 64 by the urging force of the coil springs 44 and 54.

Also, in the present embodiment, the shape viewed from above the vehicle of the projection 64 is triangular, and the angle of inclination $\theta 2$ of the second guide surface 64B relative to the inclined part 60C of the guide wall 60 is greater than the angle of inclination $\theta 1$ of the first guide surface 64A relative to the inclined part 60C of the guide wall 60 ($\theta 1 < \theta 2$). Therefore, when the coupling pins 40 and 46 move in opposition to the urging force of the coil springs 44 and 54, the pushing-in force F2 in the case when storing the holder body 14 in the case 12 becomes greater than the drawing-out force F1 in the case when drawing the holder body 14 out (F1<F2). Therefore, the holder body 14 can be easily drawn out from the case 12 can be easily drawn out from the case 12 by a simple configuration, and therefore the operability is improved.

Also, in the present embodiment, because the side surfaces of the coupling pins 40 and 46 made as shaft shapes slide with the guide wall 60, the area of contact between the coupling pins 40 and 46 and the projection 64 becomes smaller compared with a configuration in which the end surfaces of the coupling pins 40 and 46 made as shaft shapes slide with the guide wall 60. Therefore, the operating force becomes smaller and the operability is further improved.

(Case when Storing Holder Body in Case)

In the case when the holder body 14 is to be stored in the case 12, the holder body 14 is pushed in with force toward the front of the vehicle, and the coupling pins 40 and 46 are caused to slide with the second guide surface 64B of the projection 64, and are caused to ride over the projection. Or, the holder body 14 is pushed in toward the front of the vehicle in a state in which the container-holding part 30B of the right arm 30 and the container-holding part 32B of the left arm 32 [were caused] by the operator to swivel toward the direction of moving closer to each other in opposition to the urging force of the coil springs 44 and 54 and the distance between the coupling pins 40 and 46 was increased. In this case, the coupling pins 40 and 46 can easily ride over the projection 64.

Second Embodiment

Figure 6:
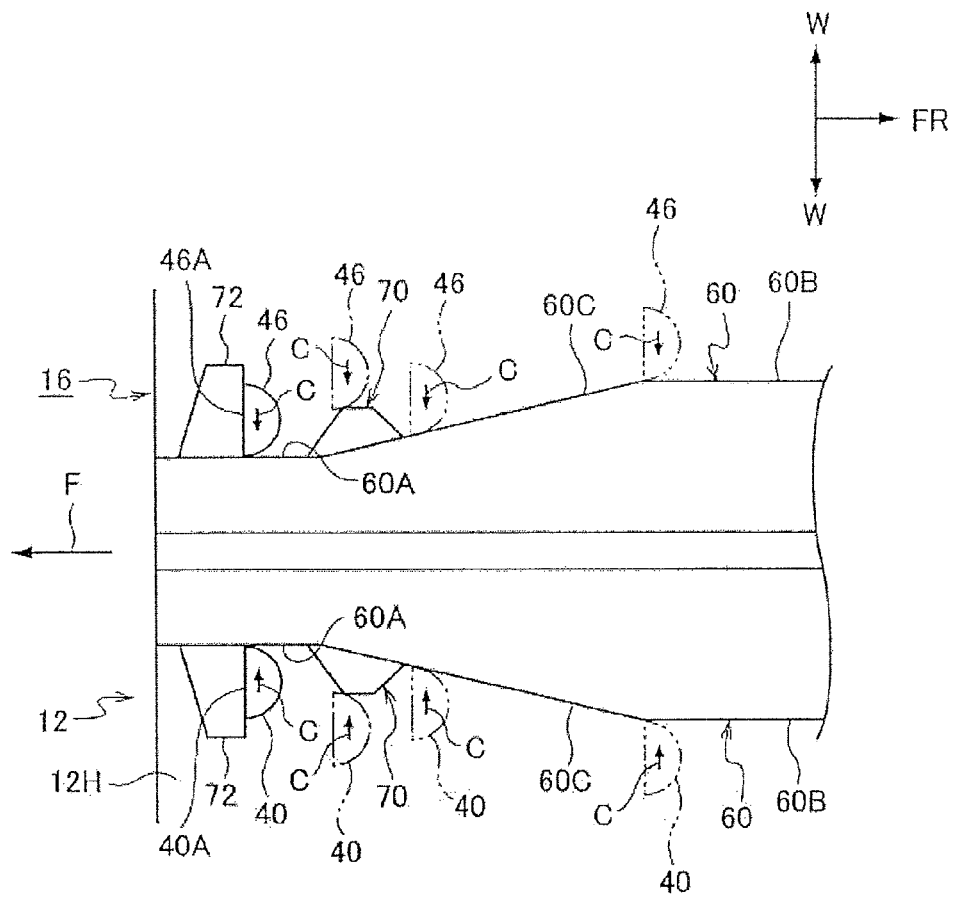
FIG. 6 is an enlarged plan view corresponding to FIG. 5 of the cup holder according to the second embodiment of the present invention.

A second embodiment of the cup holder of the present invention is described according to FIG. 6.

The same symbols are assigned to the same members as in the first embodiment, and the descriptions thereof are omitted.

In the present embodiment, as illustrated in FIG. 6, the shape viewed from above the vehicle of a projection 70 as a coupled device is trapezoidal, and a stopper 72 is formed projecting on the rear part 60A of the guide wall 60 on the downstream side in the direction of drawing out from the projection 70. Meanwhile, the cross section of the coupling pins 40 and 46 is semicircular with the side toward the rear of the vehicle as flat surfaces 40A and 46A.

Accordingly, in the present embodiment, the coupling pins 40 and 46 couple with the projection 70 in the case when the holder body 14 is subject to an impact force of a sudden stop of the vehicle, or the like, in a state being in the in-use position and the holder body 14 starts to move against the case 12 toward the front of the vehicle, just as in the first embodiment. Therefore, the movement of the coupling pins 40 and 46 toward the front of the vehicle is checked, and the holder body 14 does not inadvertently move against the case 12 toward the front of the vehicle from the in-use position. Furthermore, in the present embodiment, in the case when the holder body 14 is drawn out from the stored position to the in-use position, the operating force must be made greater when the coupling pins 40 and 46 ride over the projection 70. Therefore, a precise shift feel making it known that the holder body 14 is just about to be drawn out to the in-use position is obtained. As a result, the operability is further improved. Also, when the holder body 14 is completely drawn out from the case 12, the flat surfaces 40A and 46A of the coupling pins 40 and 46 being semicircular in cross section contact with the stopper 72 so that the holder body 14 does not fall off from the case 12. Therefore, the stopper 21 of the holder body 14 and the locking hole 23 of the case 12 in the first embodiment are no longer necessary. As a result, production of the case 12 and the holder body 14 becomes easier.

Third Embodiment

Figure 7:
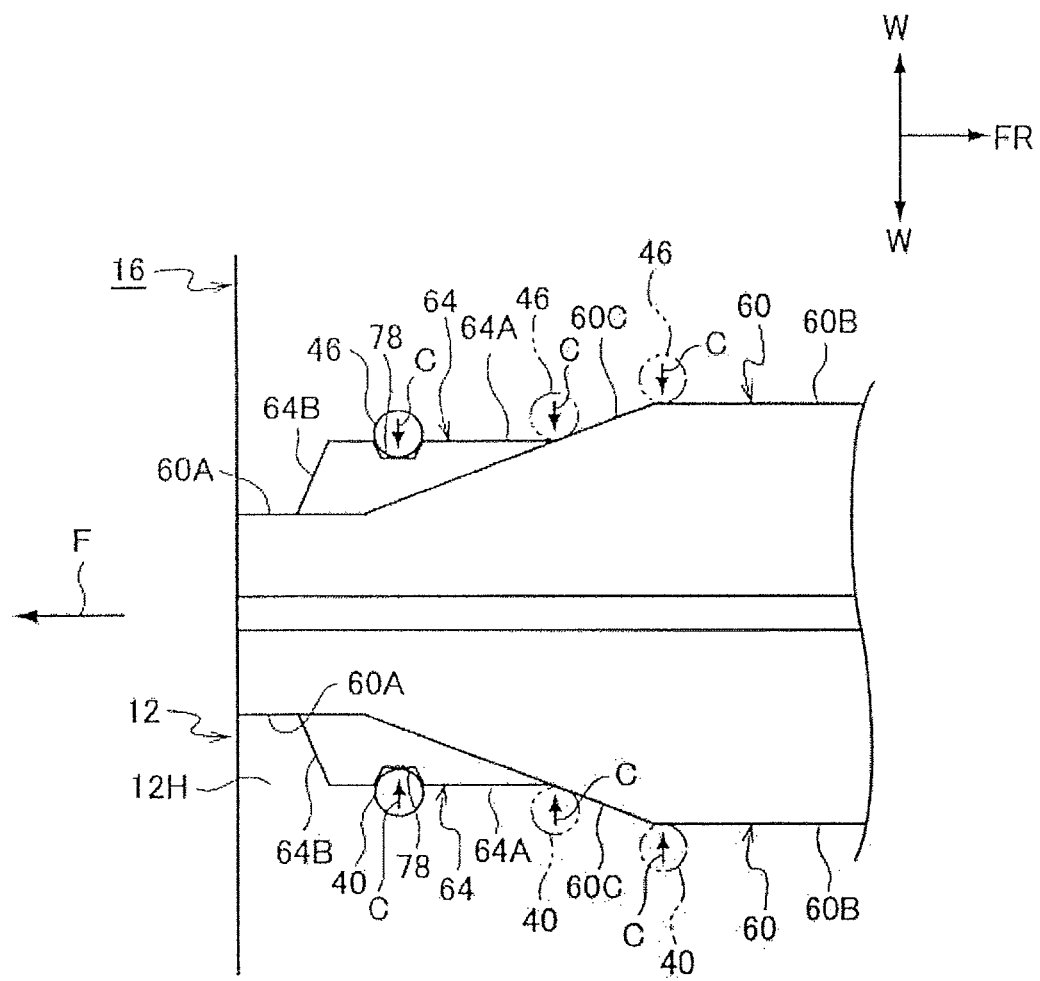
FIG. 7 is an enlarged plan view corresponding to FIG. 5 of the cup holder according to the third embodiment of the present invention.

A third embodiment of the cup holder of the present invention is described according to FIG. 7.

The same symbols are assigned to the same members as in the first embodiment, and the descriptions thereof are omitted.

In the present embodiment, as illustrated in FIG. 7, indentations 78 are formed in a middle part in the front-to-back direction of the vehicle of the first guide surface 64A of the projection 64 as a coupled device, and the coupling pins 40 and 46 couple to these indentations 78.

Accordingly, in the present embodiment, when the holder 14 is drawn out from the case 12 to the in-use position and reaches the in-use position, the coupling pins 40 and 46 couple to the indentations 78 of the projection 64 formed on the guide wall 60. Therefore, a precise shift feel in the in-use position is obtained and the operability is further improved.

Fourth Embodiment

A fourth embodiment of the cup holder of the present invention is described according to FIGS. 8 to 12.

The same symbols are assigned to the same members as in the first embodiment, and the descriptions thereof are omitted.

Figure 8:
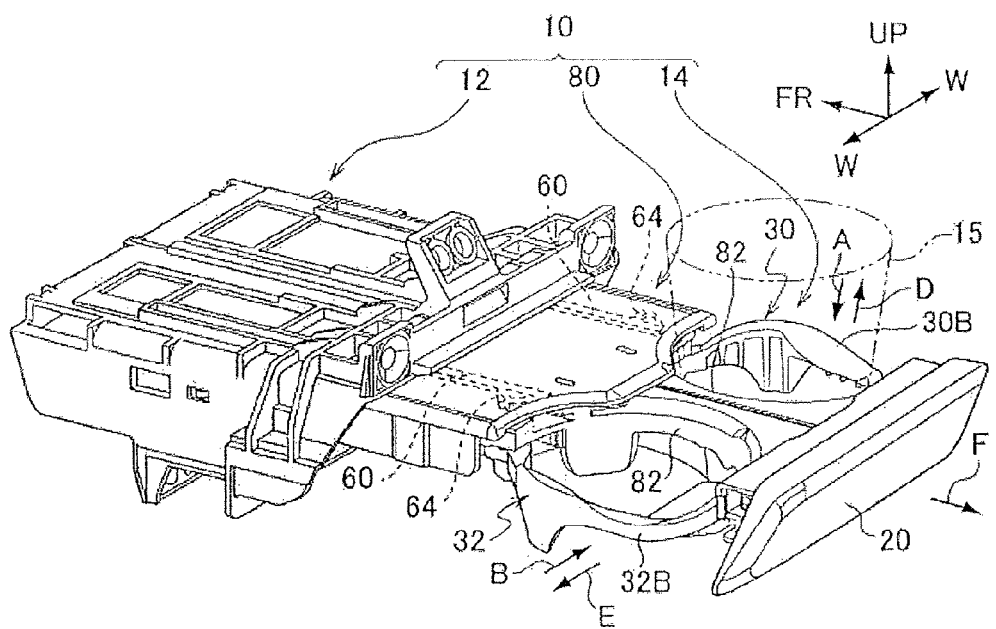
FIG. 8 is a perspective view illustrating the in-use state of the cup holder according to the fourth embodiment of the present invention.
Figure 9:
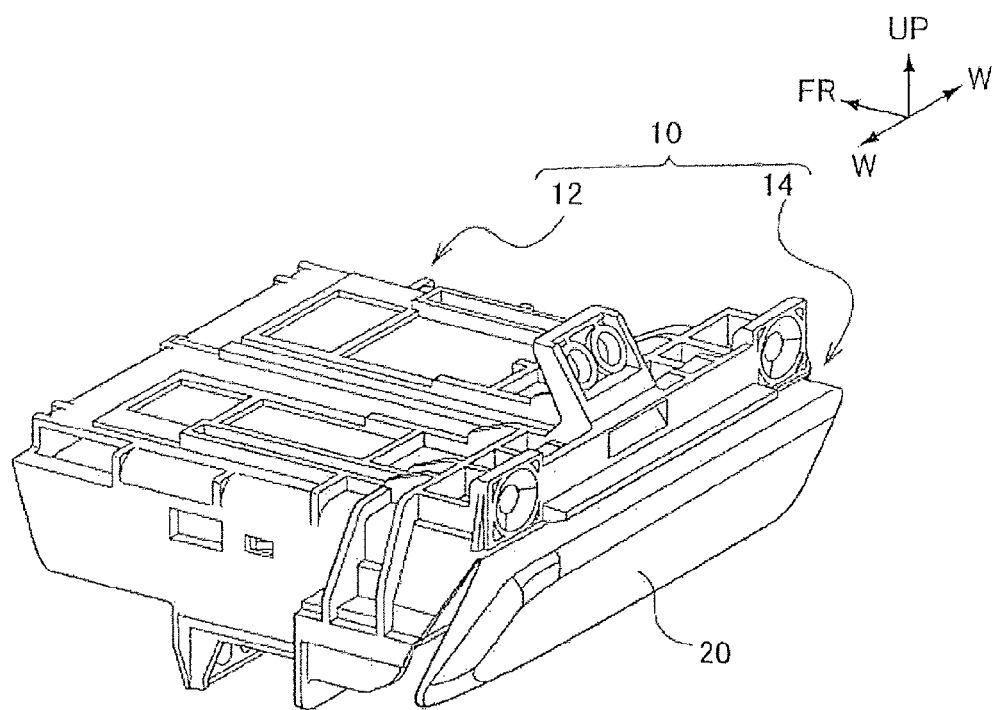
FIG. 9 is a perspective view illustrating the stored state of the cup holder according to the fourth embodiment of the present invention.

In the present embodiment, as illustrated in FIG. 8, one pair of arc-form container-holding parts 82 is formed in a position in the middle part in the width direction of the vehicle between the right arm 30 and the left arm 32 on the holder body 14. Two containers 15 can be held in parallel following the width direction of the vehicle in the holder body 14 using these container-holding parts 82 and the container-holding part 30B of the right arm 30 or the container-holding part 32B of the left arm 32. Also, an inner case 80 is provided between the holder body 14 and the case 12. This inner case 80 is movable against the case 12 toward the front and back of the vehicle together with the holder body 14, and is capable of moving also against the holder body 14 toward the front and back of the vehicle. Therefore, in the case when the holder body 14 in the stored position illustrated in FIG. 9 is drawn out from the case 12, the holder body 14 moves a fixed distance together with the inner case 80, and then the movement of the inner case 80 stops, and the holder body 14 moves against the stopper inner case 80 toward the rear of the vehicle. Meanwhile, in the case when the holder body 14 is stored in the case 12, the holder body 14 moves a fixed distance toward the front of the vehicle, and then the inner case 80 starts moving toward the front of the vehicle together with the holder body 14.

Figure 10:
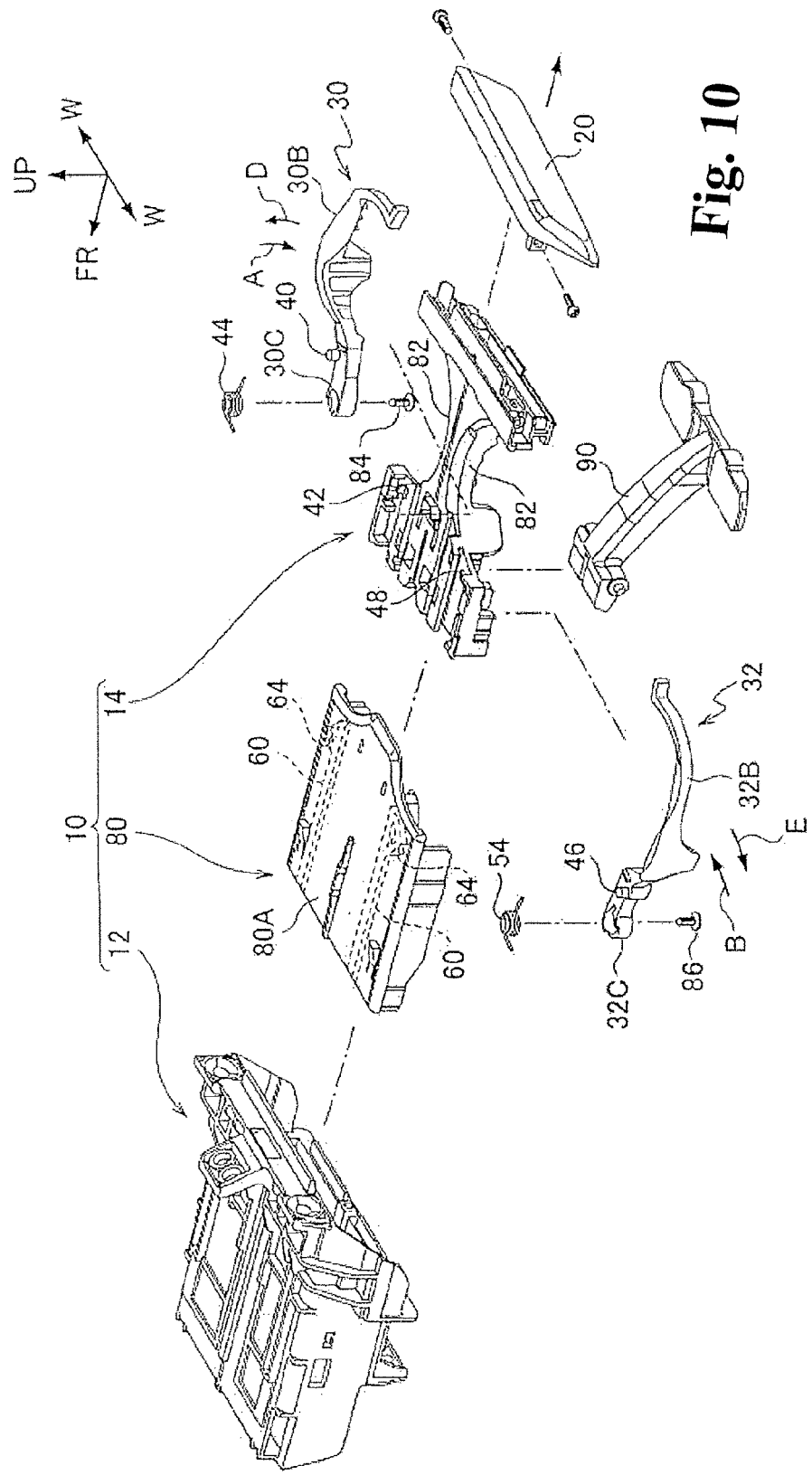
FIG. 10 is a decomposed perspective view illustrating the cup holder according to the fourth embodiment of the present invention.

As illustrated in FIG. 10, the right arm 30 is axially supported on the holder body 14 by a screw or other installation member 84 with an end part 30C on the side toward the front of the vehicle as the center of rotation. Also, the coupling pin 40 is placed projecting upward on a base portion of the container-holding part 30B in the middle part in the longitudinal direction of the right arm 30. Likewise, the left arm 32 is axially supported on the holder body 14 by a screw or other installation member 86 with an end part 32C on the side toward the front of the vehicle as the center of rotation. Also, the coupling pin 46 is formed on a base portion of the container-holding part 32B in the middle part in the longitudinal direction of the left arm 32.

The coupling pin 40 runs through a long hole 42 formed following the width direction of the vehicle on an upper wall part 80A of an inner case 80, and a leading end part projects upward from the upper wall part 80A. Therefore, when the right arm 30 swivels in the width direction of the vehicle, the coupling pin 40 swivels in the width direction of the vehicle inside the long hole 42. Meanwhile, the coupling pin 46 runs through a long hole 48 formed following the width direction of the vehicle on the upper wall part 80A of the inner case 80, and a leading end part projects upward from the upper wall part 80A. Therefore, when the left arm 32 swivels in the width direction of the vehicle, the coupling pin 46 swivels in the width direction of the vehicle inside the long hole 48. Also, one pair of guide walls 60 on the left and right, with which the coupling pins 40 and 46 slide, is formed following the front-to-back direction of the vehicle on a lower surface of the upper wall part 80A of the inner case 80. A detailed description is omitted, but the symbol "90" in FIG. 10 indicates a container mount, and the container mount 90 is capable of swiveling between an upward stored position and a downward in-use position.

Figure 11:
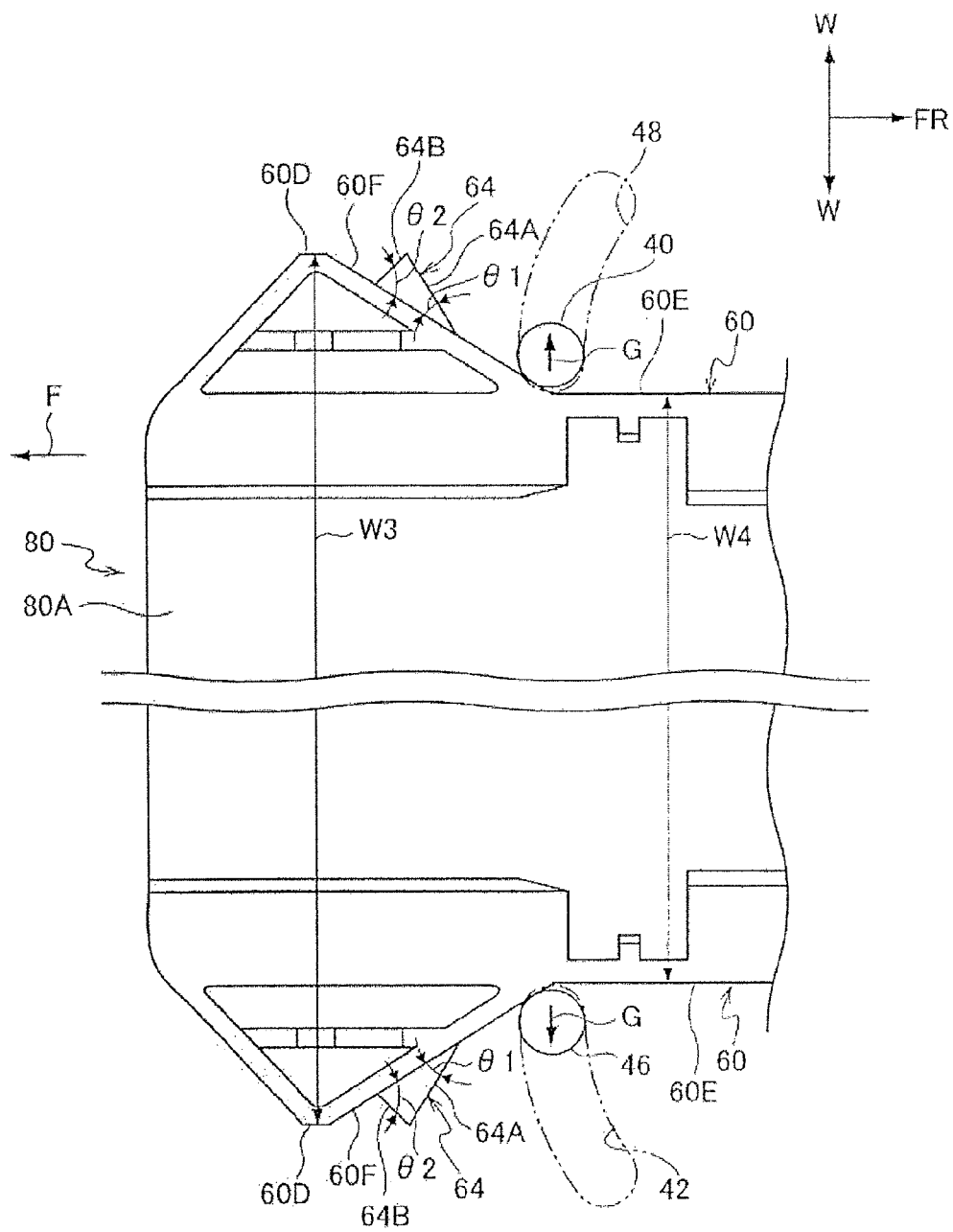
FIG. 11 is an enlarged plan view illustrating the coupling device and the coupled device of the cup holder according to the fourth embodiment of the present invention.

As illustrated in FIG. 11, the one pair of guide walls 60 on the left and right is such that a distance W3 in the width direction of the vehicle at a rear part 60D formed proximally to the opening of the inner case 80 is wider than a distance W4 of a front part 60E of the guide walls 60. Also, the middle part of the guide wall 60 in the front-to-back direction of the vehicle serves as an inclined part 60F connecting the rear part 60D and the front part 60E of the guide wall 60 in a straight linear form. Furthermore, a projection 64 as a coupled device is formed in the middle part on the inclined part 60F of the guide wall 60.

The shape viewed from above the vehicle of the projection 64 is triangular, and one side of the triangle becoming on the upstream side in the direction of sliding during drawing out of the holder body 14 serves as a first guide surface 64A continuing on the inclined part 60F on the side of the front part 60E. Also, another side of the triangle becoming on the downstream side in the direction of sliding during drawing out of the holder body 14 serves as a second guide surface 64B continuing on the inclined part 60F on the side of the rear part 60D. Also, an angle of inclination θ2 of the second guide surface 64B relative to the inclined part 60F of the guide wall 60 is greater than an angle of inclination θ1 of the first guide surface 64A relative to the inclined part 60F of the guide wall 60 (θ1<θ2).

Accordingly, in the present embodiment, when the holder body 14 moves from the stored position being stored in the case 12 (the position in FIG. 9) to the in-use position being drawn out toward the rear of the vehicle from the case 12 (the position in FIG. 8), the coupling pins 40 and 46 move following the guide wall 60 as illustrated in FIG. 11. At this time, the coupling pins 40 and 46 move with the front part 60E and the inclined part 60F of the guide wall 60 and cross the projection 64. At this time, the coupling pins 40 and 46 move in the width direction of the vehicle moving away from each other (the direction of arrow G in FIGS. 11 and 12) in opposition to the urging force of the coil spring 44 and 54. Therefore, the container-holding part 30B of the right arm 30 and the container-holding part 32B of the left arm 32 move away from each other, and swivel toward the direction of the container-holding position (the direction of arrow D and the direction of arrow E in FIG. 8).

Figure 12:
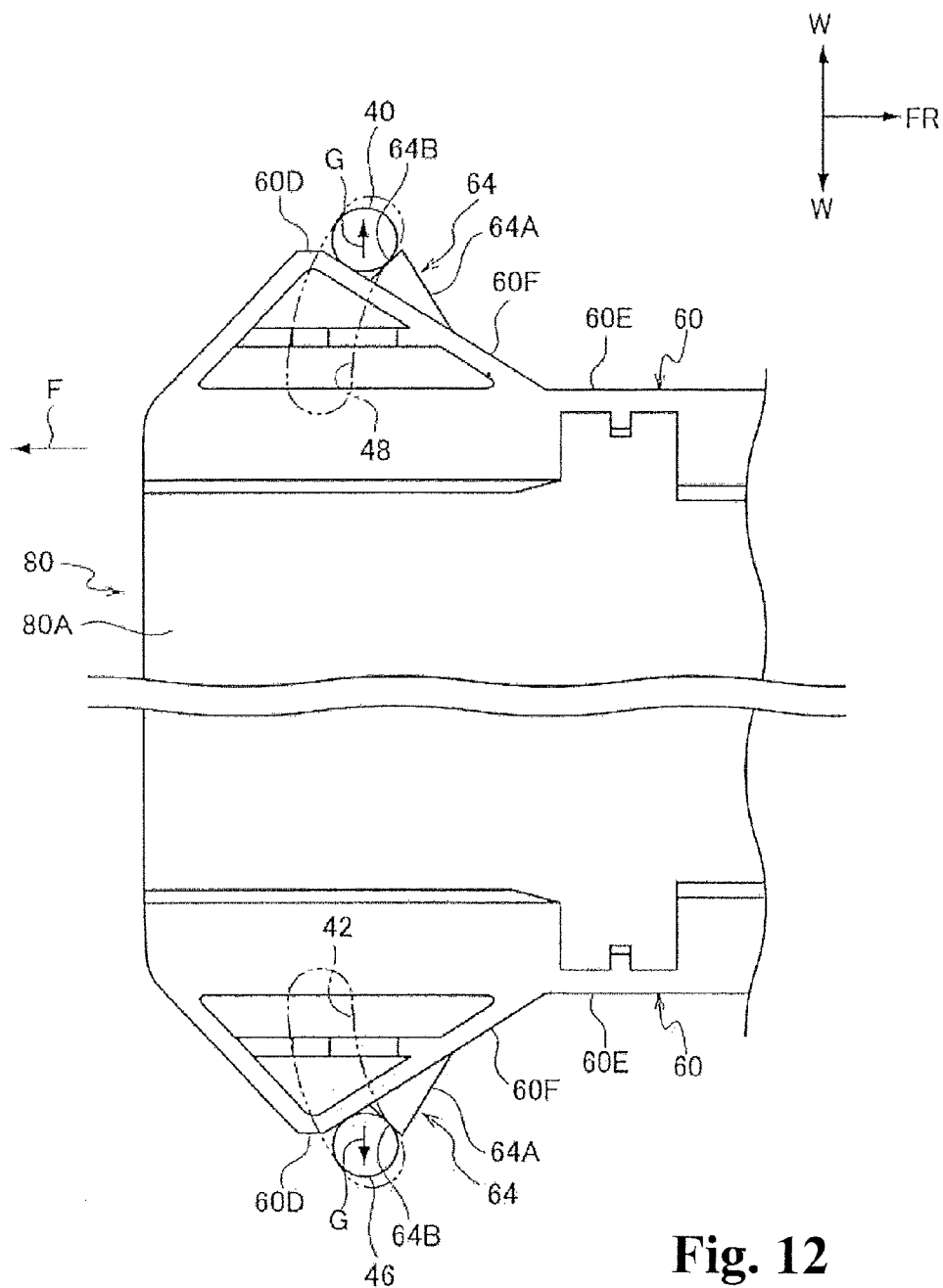
FIG. 12 is an enlarged plan view illustrating the coupling device and the coupled device of the cup holder according to the fourth embodiment of the present invention.

Meanwhile, in the case when the holder body 14 is subject to an impact force of a sudden stop of the vehicle, or the like, in a state being in the in-use position having been drawn out from the case 12 toward the rear of the vehicle (the position in FIG. 8) and the holder body 14 starts to move against the case 12 toward the front of the vehicle, the coupling pins 40 and 46 couple with the second guide surface 64B of the projection 64 as illustrated in FIG. 12. Therefore, the movement of the coupling pins 40 and 46 toward the front of the vehicle is checked, and the holder body 14 does not inadvertently move against the case 12 toward the front of the vehicle from the in-use position.

Therefore, in the present embodiment as well, just as in the first embodiment, the coupling pins 40 and 46 for causing the right arm 30 and the left arm 32 to swivel between the stored position and the container-holding position move smoothly following the guide wall 60 and couple with the projection 64 formed on the guide wall 60. Therefore, the force for drawing out of the holder body 14 does not increase and the operability can be improved, compared with a configuration in which, as in the conventional configuration, when the holder member is drawn out from the storage case, the locking claw provided on the holder member moves on the inside upper surface of the storage case in an elastically deformed state, and couples to the front end of the storage case on returning from the elastic deformation after passing through the opening of the storage case.

Also, in the present embodiment, when the holder body 14 moves toward the direction of drawing out from the case 12 (the direction of arrow F in FIG. 8), the one pair of container-holding members 30 and 32 swivels toward the direction in which the arc-form container-holding parts 30B and 32B are moved apart and become in the container-holding position (the direction of arrow D and arrow E in FIG. 8), and becomes capable of holding two containers. Meanwhile, when the holder body 14 moves toward the direction of storage in the case 12 (the direction opposite to arrow F in FIG. 8), the one pair of container-holding members 30 and 32 swivels toward the direction in which the arc-form container holding-parts 30B and 32B are moved closer and become in the stored position (the direction of arrow A and arrow B in FIG. 8). Therefore, the cup holder 10 in the stored state can be made compact.

Fifth Embodiment

Figure 13:
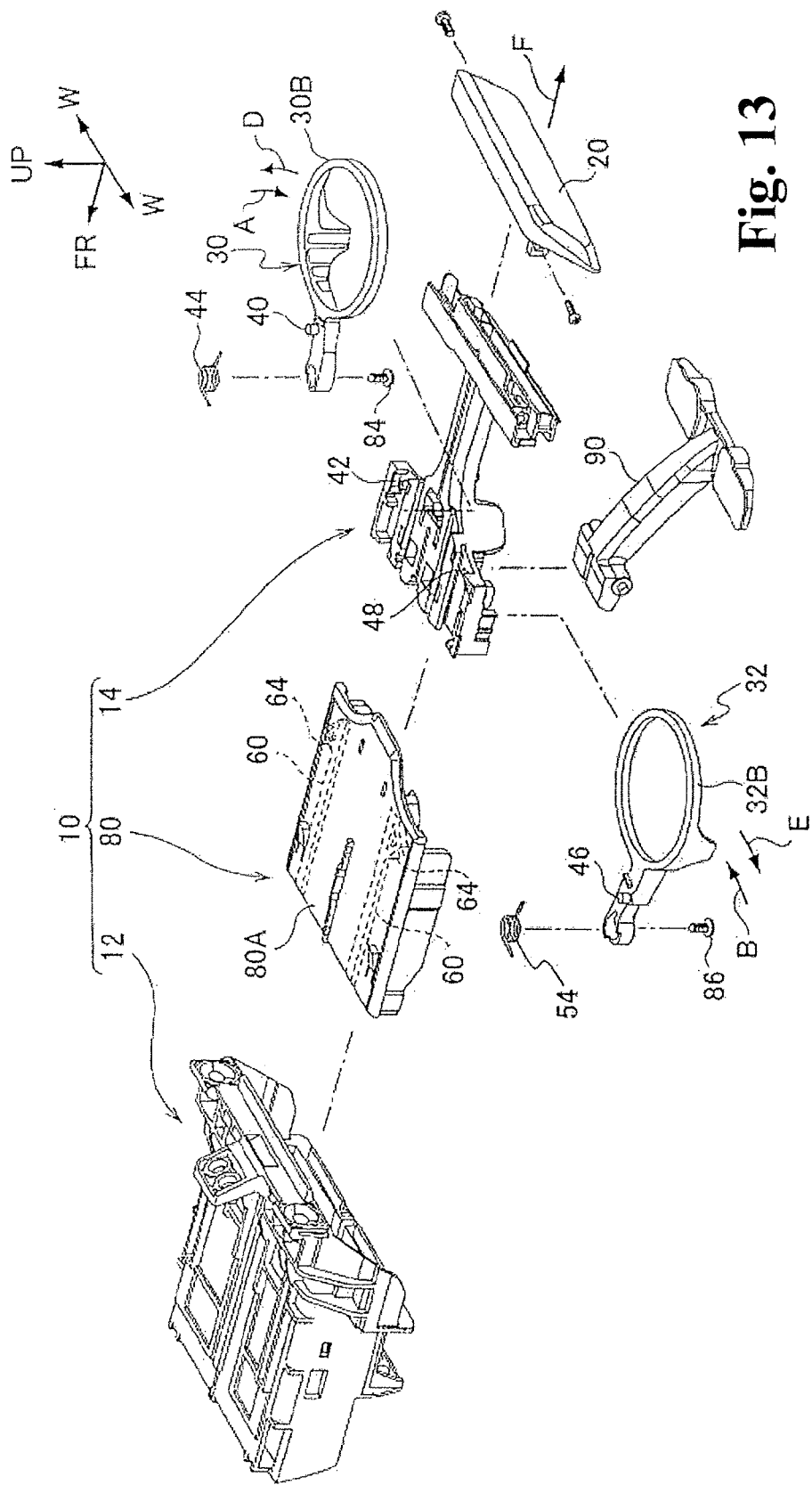
FIG. 13 is an exploded perspective view illustrating the cup holder according to the fifth embodiment of the present invention.

A fifth embodiment of the cup holder of the present invention is described according to FIG. 13.

The same symbols are assigned to the same members as in the first and fourth embodiments, and the descriptions thereof are omitted.

In the present embodiment, as illustrated in FIG. 13, each of the container-holding part 30B of the right arm 30 and the container-holding part 32B of the left arm 32 is circular. Also, when the holder body 14 moves toward the direction of drawing out from the case 12 (the direction of arrow F in FIG. 13), the container-holding members 30 and 32 swivel toward the direction in which the container-holding parts 30B and 32B become parallel (the direction of arrow D and arrow F in FIG. 13), and become capable of holding two containers. Meanwhile, when the holder body 14 moves toward the direction of storage in the case 12 (the direction opposite to arrow F in FIG. 13), the container-holding members 30 and 32 swivel toward the direction in which one portion of the container-holding part 30B and one portion of the container-holding part 32B overlap (the direction of arrow A and arrow B in FIG. 13).

Therefore, the same kinds of operation and effects as in the fourth embodiment are obtained also in the present embodiment.

Other Embodiments

The present invention was described in detail above with respect to specific embodiments, but the present invention is not limited to the abovementioned embodiments, and it is obvious to persons skilled in the art that various other kinds of embodiments are possible within the scope of the present invention. For example, the abovementioned embodiments were configured to have coil springs 44 and 54 as urging device for urging the coupling pins 40 and 46 as a coupling device toward the guide wall 60 as a guide surface, but instead of this, the configuration may be to have sheet springs or other urging device other than coil springs. Also, the configuration may be such that urging device are not provided and the coupling device are urged toward the guide surface by elastic deformation thereof, or the like.

Also, the abovementioned embodiments were configured such that the side surfaces of shaft-shaped coupling pins 40 and 46 as coupling device slide with the guide wall 60 and the first guide surface 64A and second guide surface 64B of the projection 64 as guide surfaces, but instead of this, the configuration may be such that coupling device not being shaft-shaped slide with the guide wall 60 and the first guide surface 64A and second guide surface 64B of the projection 64 as guide surfaces.

While the invention is explained with reference to the specific embodiments of the invention, the explanation is illustrative and the invention is limited only by the appended claims.

The disclosure of Japanese Patent Application No. 2011-148937 filed on Jul. 5, 2011 is incorporated herein.

What is claimed is:

1. A cup holder, comprising:
a case having an opening;
a holder body disposed movably between a holder stored position in which the holder body is stored in said case, and an in-use position in which the holder body projects from said opening;
a guide wall formed at the case;
a container-holding member pivotally supported on said holder body to swivel in a width direction of the case, the container-holding member swiveling between a container stored position in which the container-holding member is storable in said case and a container-holding position in which the container-holding member holds a container;
a coupling device disposed in said container-holding member for swiveling the container-holding member;
a coupled device formed on said guide wall, and coupling with said coupling device when said holder body moves from said in-use position toward said holder stored position to restrict the movement of said holder body toward said holder stored position; and
an urging device for urging said coupling device toward said guide wall,
wherein when the holder body is drawn out from the case, the coupling device slides on the guide wall, and the container-holding member swivels from said container stored position toward said container-holding position,
when the holder body is stored in the case, the coupling device slides on the guide wall, and the container-holding member swivels from the container-holding position toward the container stored position, and
the coupling device is disposed at an end portion of the container-holding member to pivotally support the same so that the coupling device slides inwardly of the case when the holder body is drawn out from the case, and slides outwardly the case when the holder body is stored in the case.

2. A cup holder according to claim 1, wherein said coupled device is a projection formed on said guide wall and comprising an indentation coupled with said coupling device in said in-use position.

3. A cup holder according to claim 1, further comprising a stopper formed on a downstream side in a drawing out direction from said coupled device on said guide wall, and contacting said coupling device to prevent the movement of said holder body in the drawing out direction.

4. A cup holder according to claim 1, wherein said coupling device has a shaft-shape, and a side surface of said shaft-shaped coupling device slides with said guide wall.

5. A cup holder according to claim 1, wherein said container-holding member has a container-holding part with an arc-form,
when said holder body moves toward a drawing out direction from said case, said container-holding member swivels toward a direction in which said container-holding part is in said container-holding position, and
when said holder body moves toward a storing direction into said case, said container-holding member swivels toward a direction in which said container-holding part is in said container stored position.

6. A cup holder according to claim 1, wherein said container-holding member has a container-holding part with a circular shape,
when said holder body moves toward a drawing out direction from said case, said container-holding member swivels toward a direction in which said container-holding part is in said container-holding position, and
when said holder body moves toward a storing direction into said case, said container-holding member swivels toward a direction in which said container-holding part is in said container stored position.

7. A cup holder, comprising:
a case having an opening;
a holder body disposed movably between a holder stored position in which the holder body is stored in said case, and an in-use position in which the holder body projects from said opening;
a guide wall formed on the case;
a container-holding member pivotally supported on said holder body, the container-holding member swiveling between a container stored position in which the container-holding member is storable in said case and a container-holding position in which the container-holding member holds a container;
a coupling device disposed in said container-holding member for swiveling the container-holding member; and
a coupled device formed on said guide wall, and coupling with said coupling device when said holder body moves from said in-use position toward said holder stored position to restrict the movement of said holder body toward said holder stored position,
wherein when the holder body is drawn out from the case, the coupling device slides on the guide wall and the container-holding member swivels from said container stored position toward said container-holding position, and
when the holder body is stored in the case the coupling device slides on the guide wall, and the container-holding member swivels from the container-holding position toward the container stored position, and
wherein said coupled device is a projection comprising:
a first guide surface on an upstream side of a sliding direction when drawing out said holder body; and
a second guide surface on a downstream side of the sliding direction,
wherein an angle of inclination of said second guide surface relative to said guide wall is greater than an angle of inclination of said first guide surface relative to said guide wall.

8. A cup holder, comprising:
a case having an opening;
a holder body disposed movably between a holder stored position in which the holder body is stored in said case, and an in-use position in which the holder body projects from said opening;
a guide wall formed at the case;
a container-holding member pivotally supported on said holder body to swivel in a width direction of the case, the container-holding member swiveling between a container stored position in which the container-holding member is storable in said case and a container-holding position in which the container-holding member holds a container;

a coupling device disposed in said container-holding member for swiveling the container-holding member;

a coupled device formed on said guide wall, and coupling with said coupling device when said holder body moves from said in-use position toward said holder stored position to restrict the movement of said holder body toward said holder stored position; and an urging device for urging said coupling device toward said guide wall, wherein when the holder body is drawn out from the case, the coupling device slides on the guide wall, and the container-holding member swivels from said container stored position toward said container-holding position, when the holder body is stored in the case, the coupling device slides on the guide wall, and the container-holding member swivels from the container-holding position toward the container stored position, the guide wall is formed to project inwardly of the case and extends along a longitudinal direction of the case the, guide wall including a side surface contacting the coupling device, the guide wall includes a pair of side surfaces at two sides thereof, the container-holding member includes a pair of arms having an arc-shape for holding the container, and rotating shaft parts, each being disposed on a middle section of each of the pair of arms to axial support the each of the pair of arms, and the coupling device is disposed on an end portion of each of the pair of arms to slide along the side surfaces and to move between the container stored position and the container-holding position.

9. A cup holder according to claim 8, wherein the guide wall includes a front part, a rear part having a width, between the side surfaces, smaller than that at the front part, and an inclined part between the front part and the rear part.

10. A cup holder according to claim 9, wherein the guide wall further includes projections, as the coupled device, formed at the front part.

11. A cup holder according to claim 10, wherein each of the projections includes an indentation where the coupling device engages.

\* \* \* \* \*